(12) United States Patent
Poiesz et al.

(10) Patent No.: US 9,565,557 B2
(45) Date of Patent: Feb. 7, 2017

(54) INTELLIGENTLY TRANSFERRING PRIVACY SETTINGS BETWEEN DEVICES BASED ON PROXIMITY

(71) Applicant: Google Inc., Mountain View, CA (US)

(72) Inventors: Benjamin D. Poiesz, Santa Clara, CA (US); Andrew Abramson, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/298,235

(22) Filed: Jun. 6, 2014

(65) Prior Publication Data

US 2015/0358812 A1 Dec. 10, 2015

(51) Int. Cl.
*H04W 12/02* (2009.01)
*H04W 4/02* (2009.01)

(52) U.S. Cl.
CPC ............. *H04W 12/02* (2013.01); *H04W 4/023* (2013.01)

(58) Field of Classification Search
CPC .............................. H04W 12/02; H04W 4/023
See application file for complete search history.

(56) References Cited

U.S. PATENT DOCUMENTS

| 8,620,352 | B2 | 12/2013 | Niemenmaa et al. | |
|---|---|---|---|---|
| 2004/0158455 | A1* | 8/2004 | Spivack | G06F 17/30731 704/9 |
| 2008/0070593 | A1* | 3/2008 | Altman | H04L 63/102 455/457 |
| 2010/0024045 | A1 | 1/2010 | Sastry et al. | |
| 2010/0279713 | A1* | 11/2010 | Dicke | H04M 1/72572 455/457 |
| 2012/0270568 | A1* | 10/2012 | Roh | H04W 4/02 455/456.3 |
| 2012/0315924 | A1* | 12/2012 | Park | G06F 17/30017 455/456.3 |
| 2013/0079037 | A1* | 3/2013 | Dobyns | 455/456.3 |
| 2013/0298248 | A1* | 11/2013 | Boldrev et al. | 726/26 |
| 2013/0332987 | A1* | 12/2013 | Tenneti | G06F 21/10 726/1 |

(Continued)

OTHER PUBLICATIONS

Louise Barkuus and Anind Dey, Location-Based Services for Mobile Telephony: a Study of Users' Privacy Concerns, Proceeding of the Interact 2003, 9th IFIP TC13 International Conference on Human-Computer Interaction, Jul. 2003.

(Continued)

*Primary Examiner* — Nathan Mitchell
(74) *Attorney, Agent, or Firm* — McDonnell Boehnen Hulbert & Berghoff LLP

(57) ABSTRACT

Disclosed are methods, computing devices, and computer-readable mediums for transferring privacy settings. For example, a method includes determining location information indicative of a location of a computing device. Further, the method includes determining one or more applications installed on the computing device and on one or more other computing devices that are configured to access the location information. Yet further, the method includes transferring a privacy setting of the computing device to the one or more other computing devices. In addition, the method includes determining accesses of the one or more applications to the location information indicative of the location of the computing device.

20 Claims, 12 Drawing Sheets

(56) References Cited

U.S. PATENT DOCUMENTS

| | | | | |
|---|---|---|---|---|
| 2013/0337771 A1* | 12/2013 | Klein | ............... | H04W 12/06 455/411 |
| 2014/0090091 A1* | 3/2014 | Prakash et al. | ............... | 726/30 |
| 2014/0199970 A1* | 7/2014 | Klotz | ............... | H04W 4/02 455/411 |
| 2015/0031335 A1* | 1/2015 | Dong | ............... | H04L 63/04 455/411 |

OTHER PUBLICATIONS

Bugra Gedik and Ling Liu, Location Privacy in Mobile Systems: A Personalized Anonymization Model.

* cited by examiner

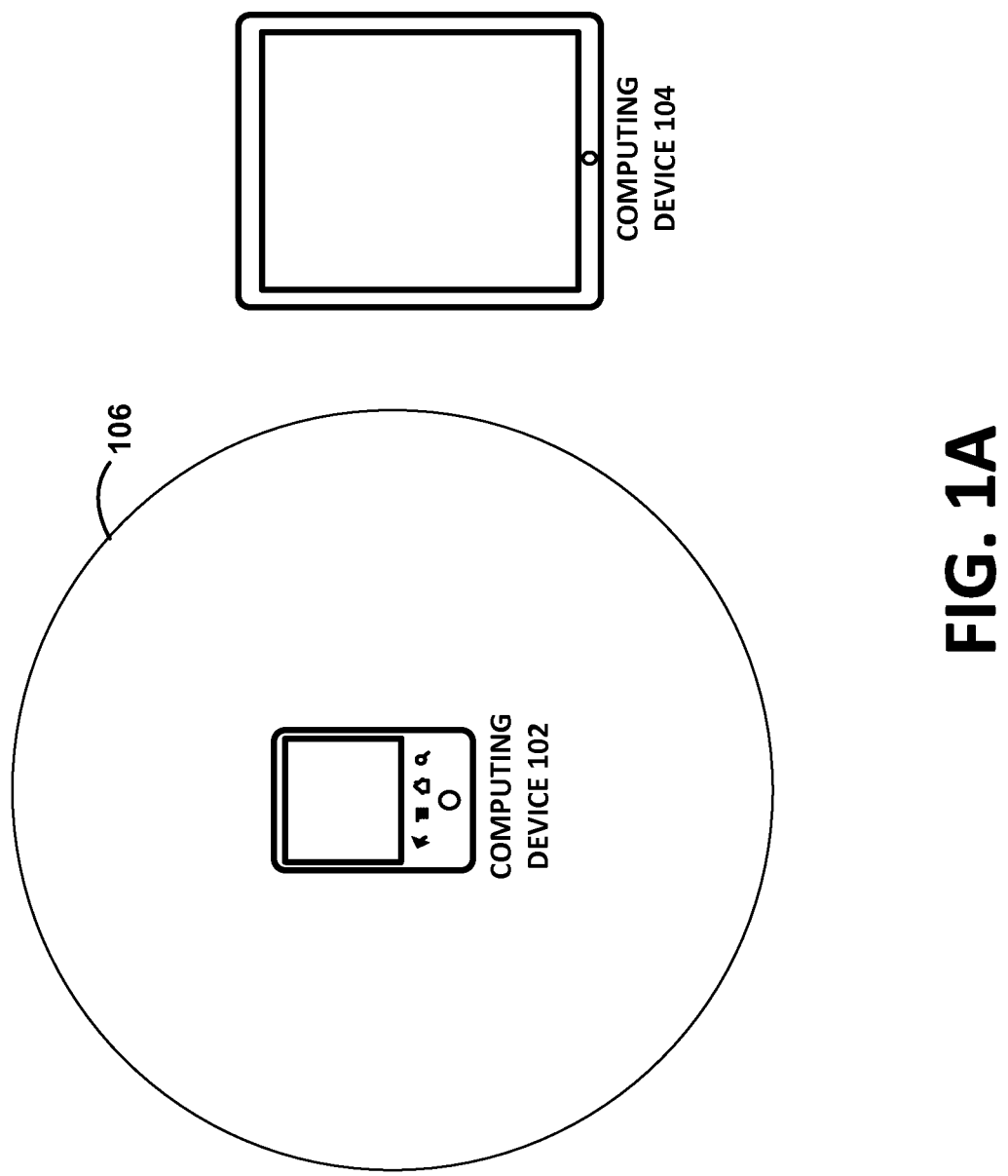

| MODES 362 | PRIVACY SETTINGS 364 (COMPUTING DEVICE 302) | PRIVACY SETTINGS 366 (COMPUTING DEVICE 306) | PRIVACY SETTINGS 368 (COMPUTING DEVICE 308) |
|---|---|---|---|
| HIDE | DENY ACCESS TO LOCATION | DENY ACCESS TO LOCATION | DENY ACCESS TO LOCATION |
| SHOW | ALLOW ACCESS TO LOCATION | ALLOW ACCESS TO LOCATION | ALLOW ACCESS TO LOCATION |
| MIX (WORK) | DENY ACCESS TO LOCATION | ALLOW ACCESS TO LOCATION | DENY ACCESS TO LOCATION |

FIG. 3C

INTELLIGENTLY TRANSFERRING PRIVACY SETTINGS BETWEEN DEVICES BASED ON PROXIMITY

BACKGROUND

Unless otherwise indicated herein, the materials described in this section are not prior art to the claims in this application and are not admitted to be prior art by inclusion in this section.

Preserving the privacy of information continues to be a major challenge to users of electronic devices. Various individuals in the electronics marketplace such as product engineers, architects, designers, and manufactures continue to face obstacles for delivering of robust solutions to protect private information. Yet, strong consumer demands for improving connectivity, enabling higher data rates, and adding more flexibility to existing designs continue to grow. As such, the priority for protecting private information tends lag behind such stronger consumer demands.

Meanwhile, users of electronic devices increasingly continue to exchange information abundantly through Internet services, possibly by installing multiple applications and freely communicating with other devices. Thus, such Internet services, applications, and other devices are increasingly opening the gateways for accessing private information, possibly belonging to numerous users. In particular, private information such PIN numbers, passwords, financial records, and/or important information may be made available to other entities.

BRIEF SUMMARY

Configuring privacy settings for one or more computing devices may be challenging. In some instances, a user of multiple computing devices such as smartphones, tablets, and/or personal computers may wish to configure the privacy settings for all such devices, without configuring each device individually. As such, example embodiments herein disclose methods, computing devices, and computer-readable mediums, amongst other embodiments, for intelligently transferring privacy settings from one device to another device.

In a first example embodiment, a method may be provided. The method may include determining location information indicative of a location of a computing device. Further, the method may include determining one or more applications installed on the computing device and on one or more other computing devices that are configured to access the location information. Yet further, the method may include transferring a privacy setting of the computing device to the one or more other computing devices. In addition, the method may include determining accesses of the one or more applications to the location information indicative of the location of the computing device.

In a second example embodiment, a computing device may be provided. The computing device may include one or more processors and a computer-readable medium. The computer-readable medium, possibly a non-transitory computer-readable medium, may have stored thereon program instructions that when executed by the one or more processors cause the computing device to perform functions. The functions may include determining location information indicative of a location of a computing device. Further, the functions may include determining one or more applications installed on the computing device and on one or more other computing devices that are configured to access the location information. Yet further, the functions may include transferring a privacy setting of the computing device to the one or more other computing devices. In addition, the functions may include determining accesses of the one or more applications to the location information indicative of the location of the computing device.

In a third example embodiment, a computer-readable medium may be provided. The computer-readable medium, possibly a non-transitory computer-readable medium, may have stored thereon program instructions that when executed by a processor cause performance of functions in connection with a server device. The functions may include determining location information indicative of a location of a computing device. Further, the functions may include determining one or more applications installed on the computing device and on one or more other computing devices that are configured to access the location information. Yet further, the functions may include transferring a privacy setting of the computing device to the one or more other computing devices. In addition, the functions may include denying the one or more applications installed on the computing device and on the one or more other computing devices from accessing the location information indicative of the location of the computing device.

In a fourth example embodiment, a system may be provided. The system may include means for determining location information indicative of a location of a computing device. Further, the system may include means for determining one or more applications installed on the computing device and on one or more other computing devices that are configured to access the location information. Yet further, the system may include means for transferring a privacy setting of the computing device to the one or more other computing devices. In addition, the system may include means for denying the one or more applications installed on the computing device and on the one or more other computing devices from accessing the location information indicative of the location of the computing device.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 1A depicts a computing device, according to an example embodiment.

FIG. 3C depicts a data entry, according to an example embodiment.

DETAILED DESCRIPTION

Figure 1B:
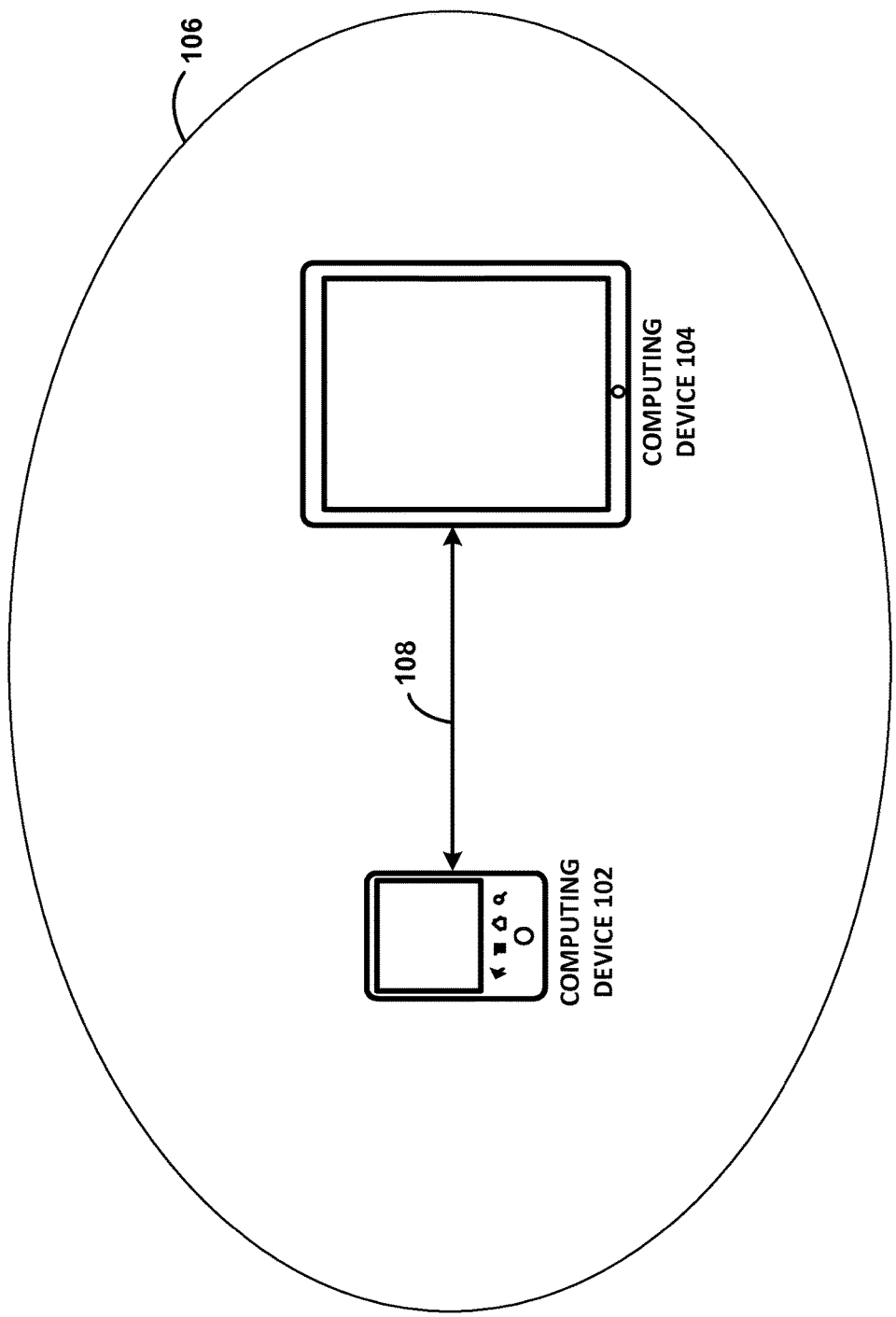
FIG. 1B depicts a location of a computing device, according to an example embodiment.

Example methods, computing devices, and computer-readable mediums are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

It may be common for an application of a computing device to keep records of a user's activities. Often times, analyzing the user's activities may benefit the user in various ways. For example, a user may install an application to their smartphone and the application may provide information indicative of restaurants in the vicinity of the user's smartphone. As such, the application may analyze and/or record the proximate location of the user's smartphone. In some instances, these applications (also referred to herein as "location-analyzing applications") may be configured to analyze and/or record the proximate location of the smartphone without any input from the user. Further, in some instances, these applications may begin analyzing the proximate location of the smartphone from the time the user turns on the smartphone.

As users increasingly carry more devices, managing location-analyzing applications may become ever more complex. For example, it may be common for a single user to have multiple computing devices such as smartphones, tablet computers, and/or laptops. Yet further, it has become increasingly more common for users to have a wearable computer, further adding to the number of devices that a single user may carry. As such, consider a scenario where a user may turn off location-analyzing applications on their smartphone. Yet, consider that the user is also wearing a smart watch. As such, the smart watch may allow location-analyzing applications to obtain information indicative of the proximate location of the smart watch. Thus, since the smart watch and the smartphone may be in the same proximate location, the user's location may be revealed to other entities, possibly without the user being aware that their location may be available to other entities. To experience a desired level of privacy, the user may have to individually configure each device in the user's possession including the smartphone, the smart watch, and/or any other devices possibly in the user's proximate location.

As such, example embodiments herein disclose methods, computing devices, and computer-readable mediums, amongst other embodiments, for intelligently transferring privacy settings from one device to multiple other devices. As such, as users increasingly carry more devices such as wearable devices, a user of may synchronize privacy settings across multiple devices to achieve the desired level of privacy. Further, the users may efficiently manage applications such as location-analyzing applications to ensure that their privacy is maintained.

II. Example Computing Device

FIG. 1A depicts a computing device, according to an example embodiment. As shown in FIG. 1A, computing device 102 may be a smartphone. Yet, in some instances, computing device 102 may be a wearable computing device, a tablet computer, a laptop computer, among other possibilities such as a car's onboard computer.

In some embodiments, a computing device may be in a given location. As shown in FIG. 1A, a location of computing device 102 may be location 106. Further, location 106 may be represented as a circle around computing device 102, possibly indicative of a given radius around computing device 102. In some instances, location 106 may be determined by a Global Positioning System (GPS) or chip in computing device 102. For example, computing device 102 may receive a GPS signal, a GLONASS signal, and/or another signal from a positioning system, and responsively determine its location 106 on the face of the Earth (e.g. an absolute location). Further, computing device 102 may receive a signal from a cellular base station and/or an 802.11 access point to determine or calculate its location 106. Yet further, computing device 102 may utilize Wi-Fi signal strength modeling, access large Wi-Fi databases, and/or determine proximate locations of one or more known wireless access point to determine its location 106.

In some instances, location 106 may be represented as a circle indicative of a given communication radius of computing device 102. In particular, location 106 may represent a communication radius of computing device 102's capability to communicate with other devices, possibly through one or more protocols or signals. For example, location 106 may represent a communication radius for computing device 102 to communicate with other devices through one or more signals such as an Ethernet signal, a Wi-Fi signal, a BLUETOOTH signal, and/or a wireless USB signal, among other possibilities. Yet, in some instance, location 106 may represent a communication radius for computing device 102 to communicate with devices farther away through one or more signals such as a GPS signal, a base station signal, and/or a radio signal.

For example, as shown in FIG. 1A, computing device 104 may be a tablet computer. Yet, in some instances, computing device 104 may be a wearable computing device, a smartphone, a laptop computer, among other possibilities. As shown in FIG. 1A, computing device 104 may be outside of location 106. In some instances, computing device 104 may be outside of a given communication radius of computing device 102. In particular, computing device 102 may be unable to communicate with computing device 104, possibly due to location of computing device 104 being far from location 106 and/or computing device 104 having limited connectivity. In particular, computing device 102 may be unable to communicate with computing device 104 through one or more of a Wi-Fi signal, a BLUETOOTH signal, and/or a wireless USB signal, among other possibilities. Yet, in some instance, computing device 102 may be unable to communicate with computing device 104 through one or more of a base station signal, and/or a radio signal.

In some embodiments, location information may indicate the location of a computing device. For example, as shown in FIG. 1A, location information may indicate location 106 of computing device 102. In some instances, the location information of location 106 may include GPS coordinates of location 106. Further, the location information of location 106 may include latitude coordinates, longitude coordinates, geographic coordinates, and/or coordinates derived from base station triangulation. Further, the location information of location 106 may include MAC addresses, IP addresses, hostnames, types, and proxy information to possibly determine location 106. Further, the location information may correspond to a Wi-Fi router connected to computing device 102, a Bluetooth device connected to computing device 102, a wireless USB device connected to computing device 102, a GPS satellite connected to computing device 102, and/or a base station connected to computing device 102, among other possibilities.

FIG. 1B depicts a location of a computing device, according to an example embodiment. Computing devices 102 and 104 may, for example, take any of the forms of the computing devices as described above in relation to FIG. 1A. Further, location 106 of computing devices 102 and 104 may, for example, take any of the forms of locations described above in relation to FIG. 1A. Yet, as shown in FIG. 1B, computing device 104 may also be in location 106. For example, computing device 104 may be inside a communication radius of computing device 102. In particular, computing device 102 may be able to communicate with computing device 104, possibly due to the location of computing device 104 being inside location 106. In particular, computing device 102 may be able to communicate with computing device 104 through one or more of a Wi-Fi signal, a BLUETOOTH signal, and/or a wireless USB signal, among other possibilities. Yet further, computing device 102 may be able to communicate or determine the location of computing device 104 through one or more of a GPS signal, a base station signal, and/or a radio signal.

For example, as shown in FIG. 1B, connection 108 may be used for transmitting and receiving data between computing device 102 and computing device 104. For example, connection 108 may be used for transferring privacy settings from computing device 102 to computing device 104. Further, connection 108 may be a local area network connection (e.g., Ethernet or Wi-Fi), a cellular connection, a point-to-point wireless connection (e.g., BLUETOOTH), and/or a cable connection (e.g., a universal serial bus (USB) and/or a high-definition multimedia interface (HDMI)). Yet further, computing devices 102 and 104 may have multiple connections for exchanging information with multiple other computing devices (not illustrated in FIG. 1A).

In some embodiments, applications may be installed on a computing device. Further, in some instances, applications may be installed on the computing device and one or more other computing devices. For purposes of illustration, an application may be a location-analyzing application, a location-recording application, an operating system application, an update to an operating system, and/or an operating system itself. Yet further, these applications may be configured to access location information indicative of a location of the computing device. In particular, these applications may be configured to analyze or record the location of the computing device, possibly as the computing device moves from one location to another location. Further, in some instances, these applications may be configured to analyze or record the location of the computing device through analyzing the locations of other nearby computing devices.

Figure 1C:
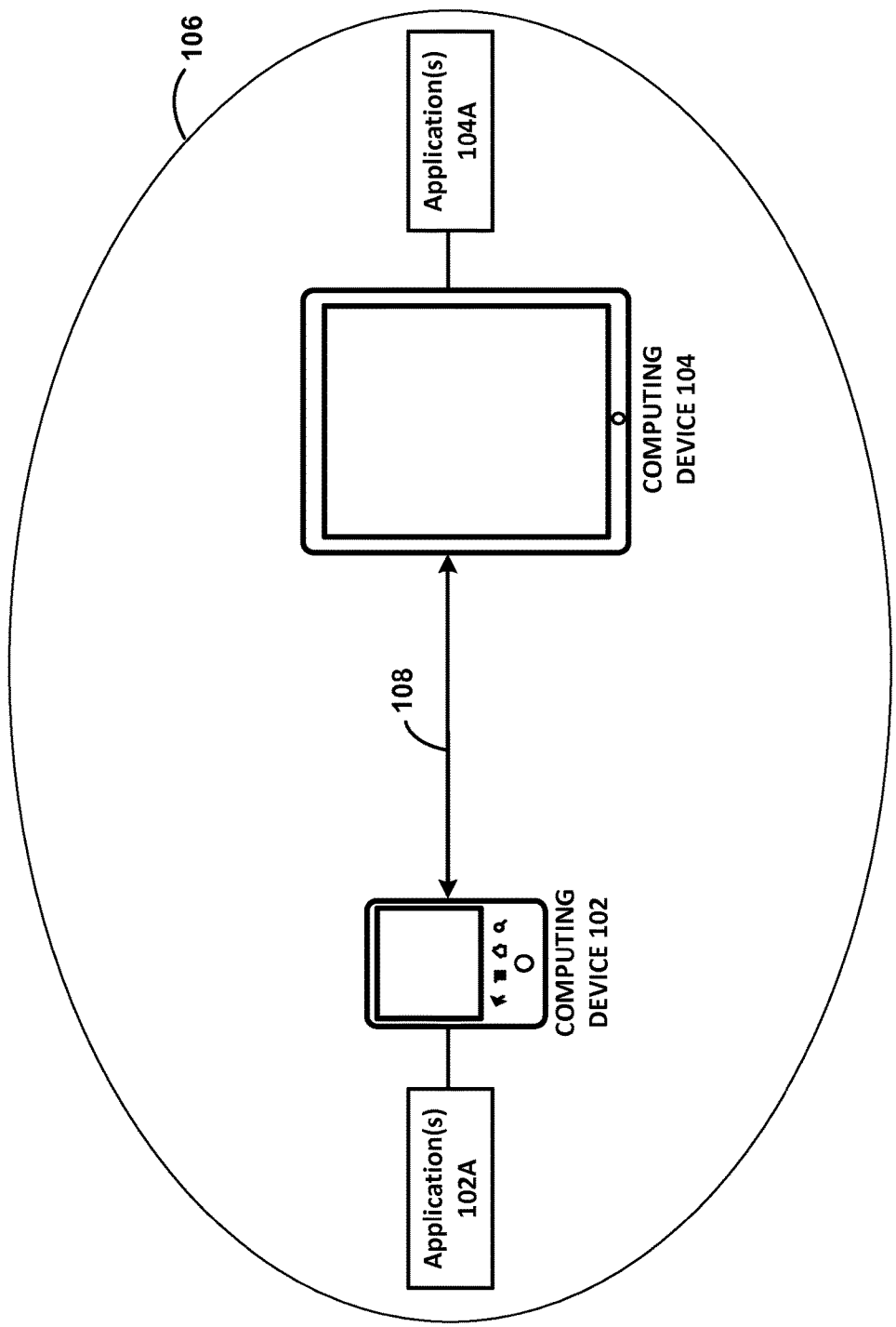
FIG. 1C depicts one or more applications, according to an example embodiment.

FIG. 1C depicts one or more applications, according to an example embodiment. Computing devices 102 and 104 may, for example, take any of the forms of computing devices described above in relation to FIGS. 1A and 1B. Further, location 106 of computing devices 102 and 104 may, for example, take any of the forms of locations described above in relation to FIGS. 1A and 1B. In addition, connection 108 may, for example, take any of the forms of connections described above in relation to FIGS. 1A and 1B. Yet, as shown in FIG. 1C, one or more applications 102A may be installed on computing device 102 and one or more applications 104A may be installed on computing device 104.

In some embodiments, one or more applications may be installed on a computing device to access or provide access to location information of the computing device. For example, as shown in FIG. 1C, one or more applications 102A (also referred to herein as "applications 102A") may access location information indicative of location 106 of computing devices 102 and 104. Further, one or more applications 104A (also referred to herein as "applications 104A") may access location information indicative of location 106 of computing devices 102 and 104. For example, applications 102A and 104A may include applications that provide information indicative of restaurants in the vicinity of the computing devices 102 and 104, as similarly described above.

Within examples, applications 102A and 104A may benefit a user of computing devices 102 and 104, respectively. For example, applications 102A and 104A may analyze or record locations of computing devices 102 and 104 in case these computing devices are lost, possibly sending an email to the user including information regarding the proximate locations of computing devices 102 and 104 for finding the devices. Further, applications 102A and 104A may be associated with an online or web-based account, possibly registering computing devices 102 and 104 for record-keeping purposes. As such, the online account may manage or record the locations of computing devices 102 and 104, possibly allowing a user to view the locations of computing devices 102 and 104 on a graphical user interface (GUI). Further, applications 102A and 104 may be GPS analyzing applications to record locations of computing devices 102 and 104. For example, applications 102A and 104 may be installed on computing devices 102 and 104 to determine a child's whereabouts, possibly to notify a parent when the child has carried one or more of computing devices 102 and 104 to a possibly a dangerous or unknown area. As such, the parent may notify the child through an alert on computing devices 102 and 104, and the child may be pulled away or deterred from the area.

In some embodiments, an application may share information with other applications. For example, applications 102A may initiate a data transfer through connection 108 to access location information in computing device 104 indicative of location 106 of computing device 104. Yet further, applications 104A may initiate a data transfer through connection 108 to access location information in computing device 102 indicative of location 106 of computing device 102. In addition, as noted, computing devices 102 and 104 may have multiple connections for exchanging information with multiple other computing devices (not illustrated in FIGS. 1A through 1C). As such, applications 102A and 104A may initiate data transfers through multiple connections with other computing devices to access location information or grant access to other computing devices to obtain location information indicative of location 106.

In some embodiments, a privacy setting of a computing device may be determined. In some instances, the privacy setting may control accesses to various types of information such as important information including financial data. In some instances, the privacy setting may determine accesses of one or more applications installed on the computing device to the location information indicative of the location of the computing device. For example, the privacy setting may deny one or more applications installed on the computing device from accessing location information indicative of the location of the computing device. In particular, a privacy setting of computing device 102 may deny applications 102A from accessing location information indicative of location 106 of computing devices 102 and 104. Further, the privacy setting of computing device 102 may deny applications 104A from accessing location information indicative of location 106 of computing devices 102 and 104. Yet further, a privacy setting of computing device 104 may deny applications 104A from accessing location information indicative of location 106 of computing devices 102 and 104. In addition, the privacy setting of computing device 104 may deny applications 102A from accessing location information indicative of location 106 of computing devices 102 and 104.

Yet, in some embodiments, the privacy setting of a computing device may be transferred to other computing devices. For example, a privacy setting of computing device 102 may be transferred to computing device 104, possibly such that a user can initiate the privacy setting for multiple devices seamlessly. In particular, the privacy setting for computing device 102 may be transferred to computing device 104 through connection 108. As such, applications 102A and applications 104A may be denied access to location information indicative of location 106.

Figure 1D:
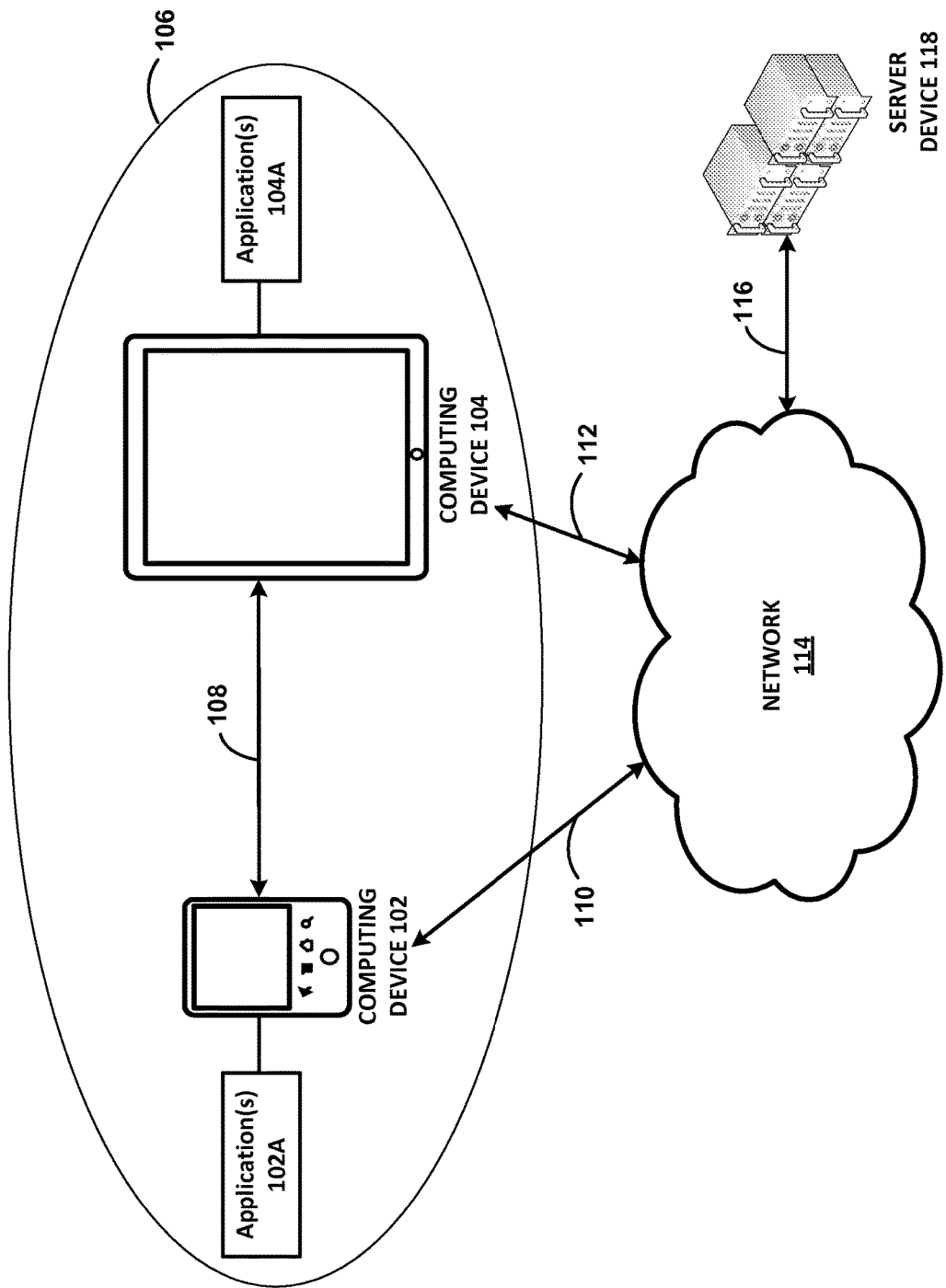
FIG. 1D depicts a network, according to an example embodiment.

FIG. 1D depicts a network, according to an example embodiment. Computing devices 102 and 104 may, for example, take any of the forms of computing devices described above in relation to FIGS. 1A through 1C. Further, location 106 of computing devices 102 and 104 may, for example, take any of the forms of locations described above in relation to FIGS. 1A through 1C. Yet further, connection 108 may, for example, take any of the forms of connections described above in relation to FIGS. 1A through 1C. In addition, applications 102A and 104A may, for example, take any of the forms of applications described above in relation to FIGS. 1A through 1C. Yet, as shown in FIG. 1D, network 114 may be connected to computing devices 102 and 104. In some instances, network 114 may be connected to computing devices 102 and 104 through applications 102A and 104A, respectively. Yet further, network 114 may be connected to computing devices 102 and 104 through connections 110 and 112, respectively. Further, network 114 may be connected to server device 118 through connection 116.

In some embodiments, computing devices may communicate with networks and server devices. Further, in some instances, computing devices may "check-in" with remote server devices to allow access to location information indicative of a location of the computing device. For example, as shown in FIG. 1D, computing devices 102 and 104 may check-in through connections 110 and 112, respectively. Further, computing devices 102 and 104 may check-in with server device 118 through network 114 and connection 116. As such, computing devices 102 and 104 may provide server device 118 with location information indicative of location 106.

In some embodiments, applications installed on computing devices may communicate with networks and server devices. As such, applications 102A and 104A may access and/or allow access to location information indicative of location 106 through network 114 and server device 118. For instance, applications 102A and 104A may be used to share location information indicative of location 106 with friends and/or family, possibly by posting the location information on social networking websites, and/or by sharing the location information with photographs and/or messages, among other possibilities.

Yet, in some embodiments, a privacy setting of a computing device may determine accesses of one or more applications to the location information indicative of the location of the computing device. For example, the privacy setting may deny applications, networks, and/or server devices from accessing location information indicative of the location of the computing device. For example, a user may be shopping for a surprise gift for their partner and may not want to reveal their location. As such, the user may set the privacy setting of computing device 102 to deny applications 102A, network 114, and server device 118 from accessing location information indicative of location 106. Yet further, the user may also have to set the privacy setting of computing device 104 to deny applications 102A, network 114, and server device 118 from accessing location information indicative of location 106.

As noted, the user may have to manage the privacy settings for both computing device 102 and computing device 104. In the above scenarios where a user may be carrying additional computing devices, the user may have to manage the privacy settings for multiple computing devices including computing device 102 and computing device 104. As such, example embodiments herein disclose methods, computing devices, and computer-readable mediums, amongst other embodiments, for intelligently transferring privacy settings from one device to another device.

III. Example Methods for Transferring

Figure 2:
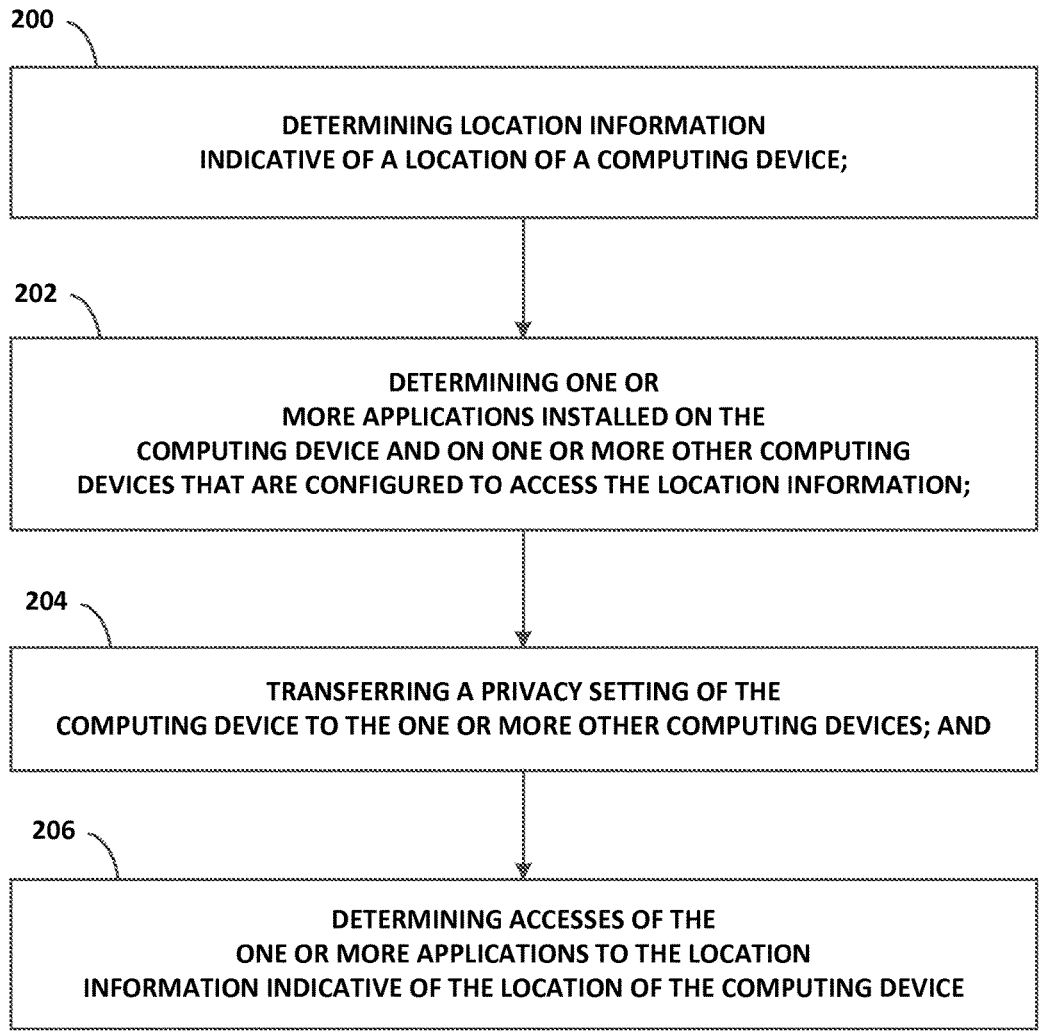
FIG. 2 depicts a flow chart, according to an example embodiment.

FIG. 2 depicts a flow chart, according to an example embodiment. The methods and/or processes illustrated by FIG. 2 may be carried out by a computing device such as computing device 102 or computing device 104, multiple computing devices such as both computing devices 102 and 104, and/or a server device such as server device 118. Further, the methods and/or processes (herein referred to as a "method" for illustrative purposes) may be carried out by other types of computing devices, server devices, and/or device subsystems. In addition, the methods illustrated in FIG. 2 may be carried out by executing computer readable instructions stored on non-transitory computer media. These instructions may be executed by a computing device to perform functions of the methods, for example.

At block 200, the method includes determining location information indicative of a location of a computing device. The location information may be determined, for example, in any manner described above in relation to FIGS. 1A through 1D.

In some embodiments, a computing device and/or a server device may determine location information stored locally on the computing device. For example, computing device 102 may determine location information indicative of location 106 of computing device 102. In particular, computing device 102 may determine location information stored in components of computing device 102. For example, computing device 102 may determine location information stored in its memories, random access memories (RAM), hard drives, central processing units, and/or controllers, among other possibilities.

In some embodiments, a computing device and/or a server device may determine location information stored on other computing devices. For example, referring back to FIGS. 1B through 1D, computing device 102 may determine location information stored in components of computing device 104. Further, computing device 102 may determine location information stored in memories, random access memories (RAM), hard drives, central processing units, and/or controllers of computing device 104, among other possibilities. In addition, referring back to FIG. 1D, computing device 102 may determine location information stored on network 114 and/or server device 118.

In some embodiments, a computing device and/or a server device may determine location information stored by one or more applications. For example, computing device 102 may determine location information indicative of location 106 stored by applications 102A. As such, computing device 102 may determine location information stored in files, folders, directories, subdirectories, catalogs, locations, data paths, and/or cache, among other possibilities.

In some embodiments, determining location information indicative of a location of a computing device may involve determining distances between computing devices and/or proximate locations of computing devices. For example, a distance may be determined between a computing device and one or more other computing devices. Further, proximate locations of the computing device and the one or more other computing devices may be determined. Yet further, a change in distance between the computing device and the one or more other computing devices may be determined. In addition, a change in the proximate locations of the computing device and the one or more other computing devices may be determined. For example, referring back to FIGS. 1A through 1D, a distance or a change in distance may be determined between computing device 102 and computing device 104. In particular, computing device 102 may determine the distance or the change in distance between computing device 102 and computing device 104. As such, by determining such distances and/or changes in distances, location information indicative of a proximate location of the computing device may be calculated or determined. Additional embodiments of determining distances are disclosed below in relation to FIG. 5.

It should be noted that the above examples for determining a distance and/or a change in distance between computing devices 102 and 104 may involve determining proximate locations of each device, possibly with respect to one another. Further, the examples of computing device 102 determining location information indicative of location 106 are provided for illustrative purposes. Other computing devices such as computing device 104 may, separately or in combination with computing device 102, determine location information indicative of location 106. Yet further, server device 118 may also, separately or in combination with computing devices 102 and/or 104, determine location information indicative of location 106, among other possibilities.

At block 202, the method includes determining one or more applications installed on the computing device and on one or more other computing devices that are configured to access the location information. The one or more application may be configured to access location information, for example, in any manner described above in relation to FIGS. 1A through 1D.

In some embodiments, a computing device and/or a server device may determine applications installed on a computing device that are configured to access location information. For example, computing device 102 may determine applications 102A installed on computing device 102 that are configured to access location information indicative of location 106. Further, computing device 102 may determine applications 104A installed on computing device 104 that are configured to access location information indicative of location 106.

In some embodiments, applications may be designated as location-analyzing applications. For example, a user may designate each application installed on a computing device as a possible location-analyzing application. In some instances, referring back to FIGS. 1A through 1C, computing devices 102 and 104 may request the user to indicate whether applications 102A and 104A are location-analyzing applications, possibly in relation to installing applications 102A and 104A. For example, the user may be required to make such indications before applications 102A and 104A may be installed. Further, once making such indications, computing devices 102 and 104 may designate applications 102 and 104A as location-analyzing applications amongst other location-analyzing applications possibly installed.

It should be noted that the examples of computing device 102 determining one or more applications configured to access location information are provided for illustrative purposes. Other computing devices such as computing device 104 may, separately or in combination with computing device 102, determine the one or more applications. Yet further, server device 118 may also, separately or in combination with computing devices 102 and/or 104, determine the one or more applications, among other possibilities.

At block 204, the method includes transferring a privacy setting of the computing device to the one or more other computing devices. The privacy setting of the computing device may be transferred to one or more other computing devices, for example, in any manner described above in relation to FIGS. 1A through 1D.

In one example, consider a scenario such that a user of computing device 102 provides an indication of a privacy setting to disable location-analyzing applications installed on computing device 102. Further, the indication of the privacy setting may be communicated to computing device 104 through connection 108. As such, computing device 104 may initiate a privacy setting to disable location-analyzing applications of computing device 104. Yet further, possibly after some time, the user may wish to enable location-analyzing applications on computing devices 102 and 104. As such, the user may provide an indication of a privacy setting to enable location sharing of computing device 102. Further, the indication of the privacy setting may be communicated to computing device 104 through connection 108. As such, computing device 104 may initiate a privacy setting to enable location sharing of computing device 104. Thus, in some instance, the privacy settings of computing device 102 and 104 may be synchronized.

In some embodiments, the computing device may transfer a privacy setting of the computing device to one or more other computing device based on location. For example, referring back to FIGS. 1A and 1B, consider a scenario such that computing device 104 moves from outside location 106 to inside location 106. As such, computing device 102 may determine that computing device 104 has entered location 106, possibly by determining computing devices presence through connection 108. In particular, computing device 102 may pair with computing device 104, possibly establishing connection 108 to determine computing device 104 has entered location 106. As such, computing device 102 may transfer privacy setting to computing device 104, without any user intervention.

Further, consider a scenario such that computing device 104 has a privacy setting set to "private" while outside of location 106, possibly denying applications 104A from identifying the proximate location of computing device 104. Further, computing device 104 may move to location 106. As such, computing device 104 may transfer the "private" setting to computing device 102 such that computing device 102 changes from a "normal" setting to the "private" setting. In some instances, computing device 104 may exit location 106 and computing device 102 may revert back from the "private" setting to the "normal" setting. Further, computing device 104 may return to location 106 and computing device 102 may again change from the "normal" setting to the "private" setting.

Figure 3A:
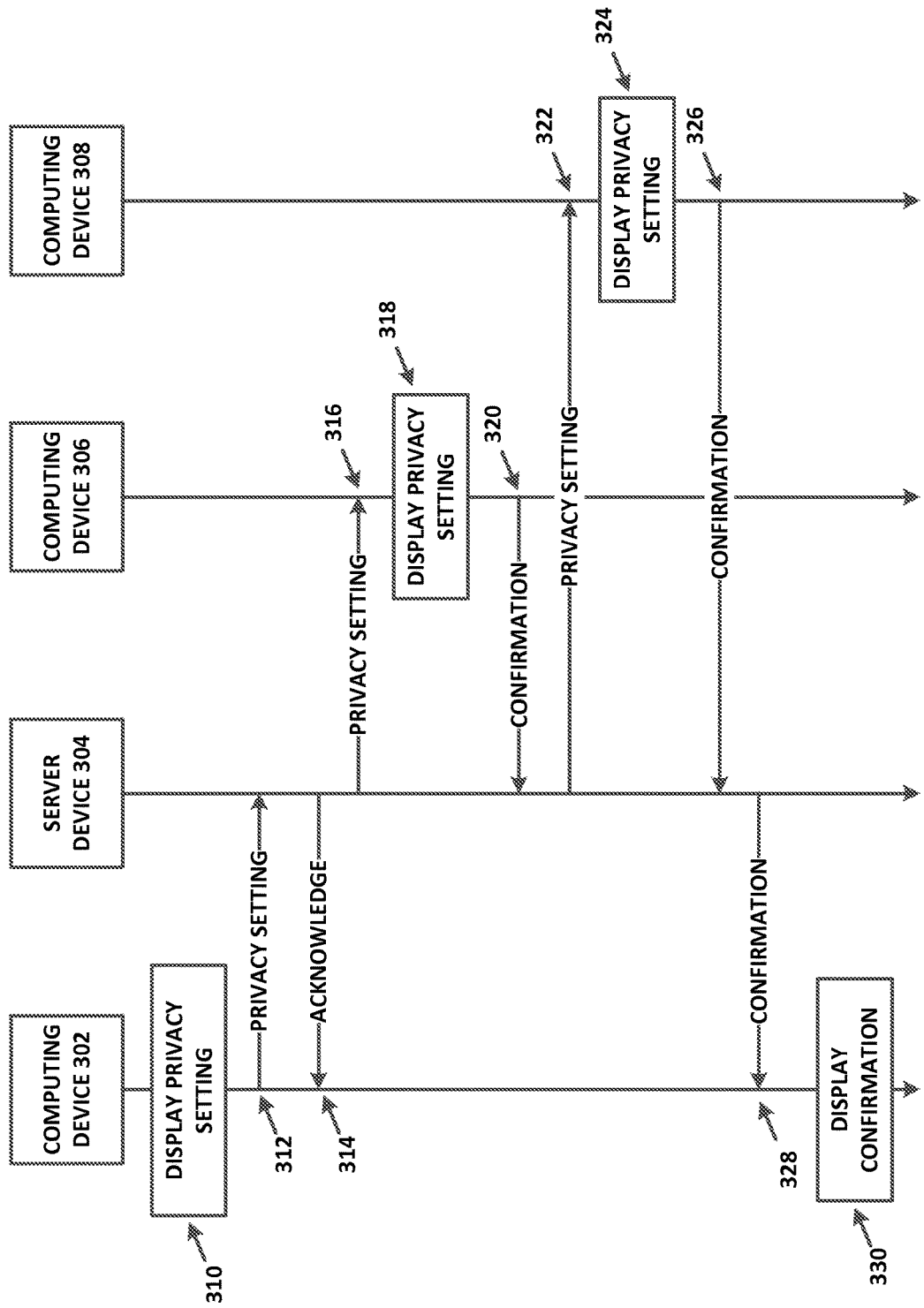
FIG. 3A depicts a message flow chart, according to an example embodiment.

FIG. 3A depicts a message flow chart, according to an example embodiment. The privacy setting of computing device 302 may be transferred to one or more other computing devices 306 and 308, for example, in any manner described above in relation to FIGS. 1A through 1D. In particular, computing devices 302 and 306 may correspond to computing devices 102 and 104, respectively. Yet further, computing device 308 may be another computing device that may receive privacy settings from computing device 302, computing device 306, and/or server device 304. In addition, server device 304 may correspond to server device 118 of FIG. 1D, among other possibilities.

In some embodiments, a privacy setting may be transferred to one or more computing devices through a variety of modalities. For example, computing devices 302, 304, and 306 may be associated with an online or web-based account for managing the privacy settings of each device. In particular, computing devices 302, 304, and 306 may be registered with an account for managing privacy settings. Further, in some instances, a privacy setting may be transferred by the operating system of a computing device. Yet further, a privacy setting may be transferred by a backend service running on one or more of the computing devices. Yet further, a privacy setting may be transferred by a third-party service, possibly an online or web-based service configured to transfer privacy settings from one device to another device. As such, steps 310 through 330 of FIG. 3A may be implemented in variety of different ways.

In some embodiments, a computing device may transfer a privacy setting to one or more other computing devices. For example, at step 310 of FIG. 3A, computing device 302 may display a privacy setting, possibly through a graphical user interface (GUI) associated with computing device 302. In some instances, the privacy setting may be displayed by the user's interaction with computing device 302, possibly initiating a privacy setting on computing device 302 to deny one or more applications access to location information indicative of a proximate location of computing device 302. Further, in some instances, the privacy setting may be displayed to indicate the transfer of the privacy setting. At step 312, computing device 302 may transfer the privacy setting to server device 304. Further, at step 314, server device 304 may send an "acknowledge" message indicating that it has received the privacy setting. In some instances, computing device 302 may not receive the acknowledge message. As such, computing device 302 may display an error message (not shown in FIG. 3A) to indicate that the privacy setting must be re-transferred.

In some embodiments, a server device may transfer a privacy setting of the computing device to the one or more other computing devices. For example, at step 316, server device 304 may transfer the privacy setting received from computing device 302. In particular, server device 304 may transfer the privacy setting to computing device 306. As such, at step 318, computing device 306 may display the privacy setting transferred from server device 304, possibly indicating that the privacy setting has been initiated on computing device 306. In particular, the privacy setting may deny one or more applications installed on computing device 306 from accessing location information indicative of a proximate location of computing device 302 and/or computing device 306. Further, at step 320, computing device 306 may send a confirmation that the privacy setting has been transferred to computing device 306 and/or initiated on computing device 306. In particular, the confirmation may indicate that the privacy setting has been successfully implemented in computing device 306, possibly denying applications from accessing location information on computing devices 302 and/or 306.

In some embodiments, the server device may transfer a privacy setting to multiple computing devices. For example, at step 322, server device 304 may transfer the privacy setting received from computing device 302. In particular, server device 304 may transfer the privacy setting to computing device 308. As such, at step 324, computing device 308 may display the privacy setting transferred from server device 304, possibly indicating that the privacy setting has been initiated on computing device 308. In particular, the privacy setting may deny one or more applications installed on computing device 308 from accessing location information indicative of a proximate location of computing devices 302, 304, and/or 308. Further, at step 326, computing device 308 may send a confirmation that the privacy setting has been transferred to computing device 308 and/or initiated on computing device 308. In particular, the confirmation may indicate that the privacy setting has been successfully implemented in computing device 308, possibly denying applications from accessing location information on computing devices 302, 306, and/or 308.

In some embodiments, the server device may confirm the transfer of a privacy setting of the computing device to one or more other computing devices. For example, at step 328, server device 304 may send a confirmation indicating that the privacy setting has transferred to computing devices 306 and 308, possibly also indicating that the privacy setting has been successfully implemented on computing devices 306 and 308. In some instances, if computing device 302 does not receive the confirmation message, computing device 302 may display an error message (not shown in FIG. 3A), possibly to re-transfer the privacy setting of computing device 302.

Figure 3B:
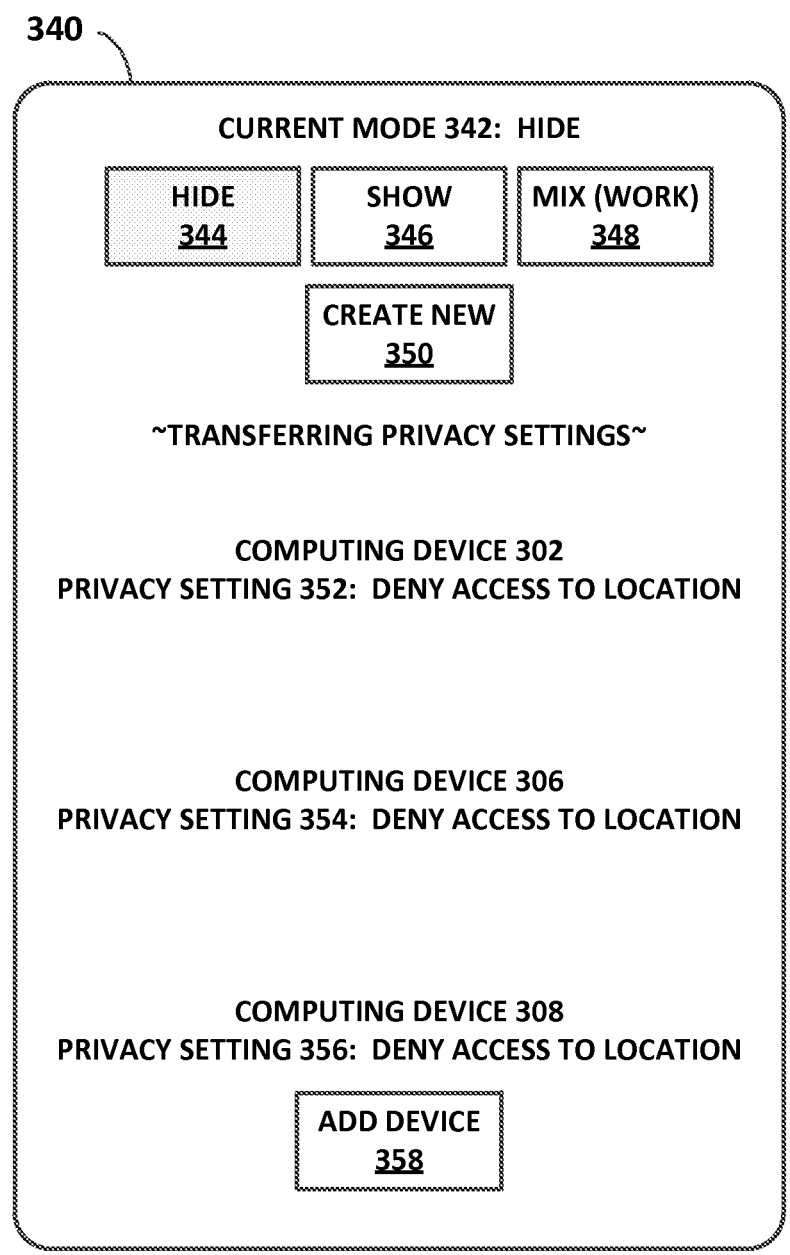
FIG. 3B depicts a graphical user interface, according to an example embodiment.

FIG. 3B depicts a graphical user interface, according to an example embodiment. Graphical user interfaces (GUI) 340 may be generated or displayed on one or more computing devices, for example, the computing devices described above in relation to FIGS. 1A through FIG. 3A. For example, GUI 340 may correspond to step 310 of FIG. 3A for generating or displaying the privacy setting of computing device 302. As shown in FIG. 3B, a number of inputs may be provided in GUI 340. In particular, these inputs may include hide 344, show 346, mix (work) 348, create new 350, and add device 358 may be selected by a user.

As shown in FIG. 3B, the current mode 342 may display "hide" mode for denying applications from accessing location information, possibly indicative of the location of computing device 302. In particular, a number of modes may be selected through inputs, for example, inputs hide 344, show 346, work 348, and/or create new 350. As noted, by selecting hide 344, current mode 342 may be changed to "hide" mode for denying applications from accessing the location information. Further, by selecting show 346, current mode 342 may be changed to "show" mode for allowing applications to access the location information. Yet further, by selecting the input work 348, the current mode 342 may be changed to "mix" or "work" mode for allowing some applications to access the location information and denying some applications from accessing the location information.

Further, as shown in FIG. 3B, by selecting hide 344, privacy settings of a computing device may be transferred to other computing devices. For example, as shown, the notification in GUI 340 provides "transferring privacy settings". In accordance with FIG. 3A, for example, privacy settings from computing device 302 may be transferred to computing devices 304 and 308, possibly through server device 304. As such, GUI 340 may display privacy settings 352, 354, and 356 of computing devices 302, 306, and 308, respectively, as "deny access to location". In particular, computing devices 302, 306, and 308, may deny applications installed on each device from accessing location information indicative of the locations of each device.

Yet further, as shown in FIG. 3B, add device 358 may be selected to add one or more devices to various modes designated by inputs hide 344, show 346, mix (work) 348, create new 350. For example, a user may purchase a new computing device such as a wearable computing device, e.g., a head-mountable device. As such, the user may add the wearable computing device to the list of devices in GUI 340 that may "hide" when input hide 344 is selected. As such, by selecting hide 344, one or more of computing devices 302, 306, and 308 may transfer privacy setting to the wearable computing device. Further, the wearable computing device may deny one or more applications installed on the wearable computing device from accessing location information indicative of a location of the wearable computing device and/or computing devices 302, 306, and 308.

In some embodiments, GUI 340 may be operated through voice commands. For example, a user may say "hide" in the vicinity of the head-mountable device and hide 344 may be selected on GUI 340 which may be generated on a graphical display of the head-mountable device. Further, the user may say "show" and show 346 may be selected. Yet further, the user may say "mix" and mix (work) 348 may be selected. In addition, the user may say "create new" and create new 350 may be selected. Further, the user may say "add device" and add device 358 may be selected.

FIG. 3C depicts a data entry, according to an example embodiment. Data entry 360 may be stored on one or more computing devices, for example, the computing devices described above in relation to FIG. 1A through FIG. 3B. Further, as shown in data entry 360, modes 362 may correspond to the modes that may be selected through the inputs such as hide 344, show 346, mix (work) 348 in GUI 340 of FIG. 3B. In particular, as shown in data entry 360, modes 362 may include various modes such as "hide", "show", and "mix (work)". Yet further, data entry 360 may also include privacy settings 364 of computing device 302, privacy settings 366 of computing device 306, and privacy settings 368 of computing device 308.

As shown in FIG. 3C, various modes may cause computing device 302 to transfer the privacy settings 364 of computing device 302 to computing devices 306 and 308. For example, "hide" of modes 362 may transfer a "deny access to location" privacy setting of computing device 302 to computing devices 306 and 308. As such, computing devices 306 and 308 may deny applications installed on each computing device from accessing location information indicative of proximate locations of computing devices 302, 306, and 308.

Further, "show" of modes 362 may cause computing device 302 to transfer an "allow access to location" privacy setting of computing device 302 to computing devices 306 and 308. As such, computing devices 306 and 308 may allow applications installed on each computing device to access location information indicative of proximate locations of computing devices 302, 306 and 308.

Further, "mix (work)" of modes 362 may cause computing device 302 to transfer a "deny access to location" privacy setting of computing device 302 to computing device 308. As such, computing device 308 may deny applications installed on computing device 308 from accessing location information indicative of the proximate locations of computing devices 302, 306, and/or 308. Yet, computing device 306 may have an "allow access to location" privacy setting. As such, computing device 306 may allow applications installed on computing device 306 to access location information indicative of proximate locations of computing devices 302, 306, and 308.

Referring back to FIG. 2, at block 206, the method includes determining accesses of the one or more applications to the location information indicative of the location of the computing device. For example, the method may include denying the one or more applications installed on the computing device and on the one or more other computing devices from accessing the location information indicative of the location of the computing device. The one or more applications installed on the computing device and the other computing devices may be denied from accessing location information, for example, in any manner described above in relation to FIG. 1A through FIG. 3C. For example, the one or more applications may be denied from accessing location information in any manner described above in relation to block 204. In particular, a privacy setting may be transferred to other computing devices to deny one or more application from accessing location information.

In some embodiments, applications on a computing device may be disabled. For example, in some instances, one or more applications installed on the computing device may be disabled. Further, in some instances, applications that may be configured to analyze or record the location of a computing device and/or designated as a location-analyzing application may be disabled, among other possibilities.

In some embodiments, applications may be denied from accessing components of the computing device. For example, referring back to FIGS. 1B through 1D, computing device 102 may deny the applications from accessing location information stored in memories, random access memories (RAM), hard drives, central processing units, and/or controllers of computing device 104, among other possibilities. In addition, referring back to FIG. 1D, computing device 102 may deny the applications from accessing location information stored on network 114 and/or server device 118.

In some embodiments, the applications may be denied access to location information stored in a computing device. For example, referring back to FIGS. 1B through 1D, computing device 102 may determine location information indicative of location 106 stored by applications 102A. As such, computing device 102 may deny the applications from accessing location information stored in files, folders, directories, subdirectories, catalogs, locations, data paths, and/or cache, among other possibilities.

Figure 4A:
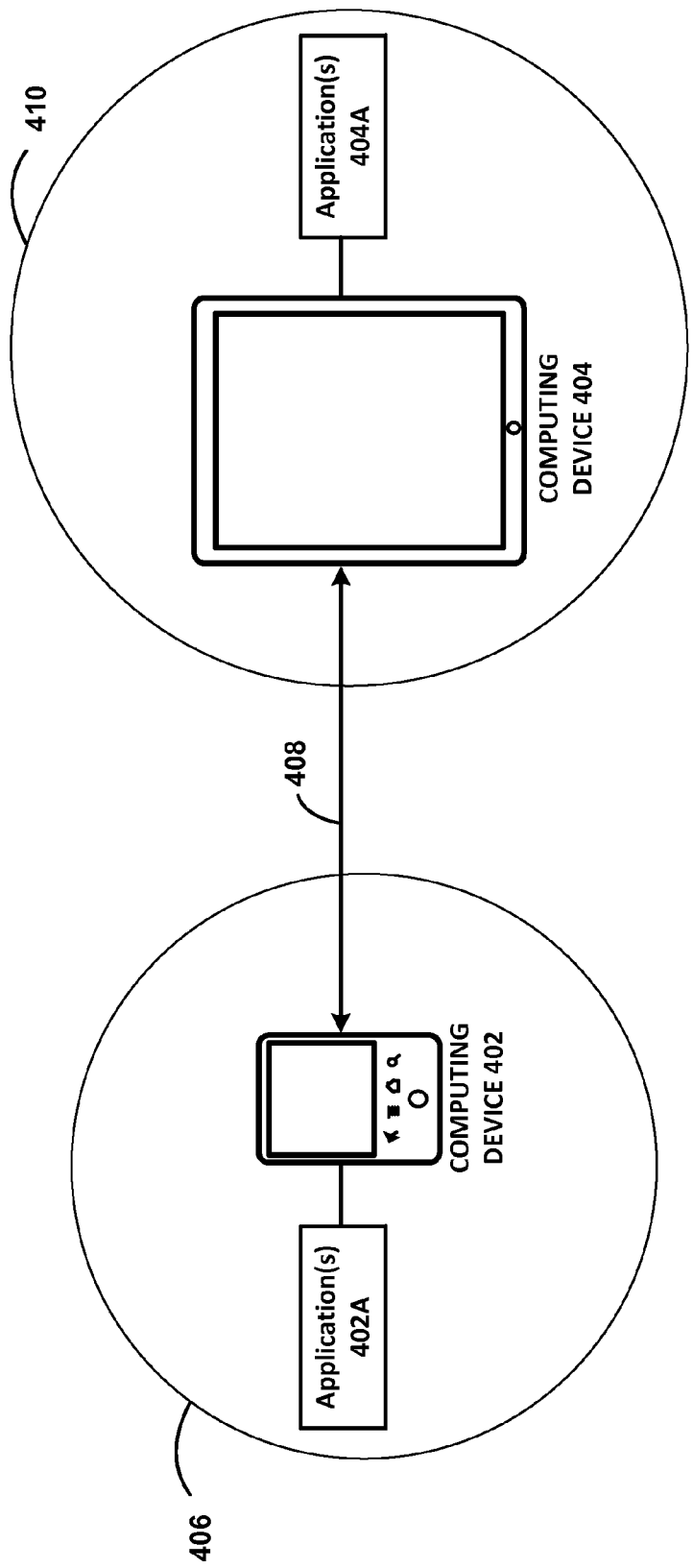
FIG. 4A depicts a computing device and a second location, according to an example embodiment.

FIG. 4A depicts a computing device and a second location, according to an example embodiment. Computing devices 402 and 404 may, for example, take any of the forms of computing devices described above in relation to FIGS. 1A through 1D. Further, connection 408 may, for example, take any of the forms of connection 108 described above in relation to FIGS. 1A through 1D. Yet further, location 406 of computing device 402 may, for example, take any of the forms of locations described above in relation to FIGS. 1A through 1D. Yet further, one or more applications 402A and 404A may, for example, take any of the forms of applications described above in relation to FIGS. 1A through 1D. Yet, as shown in FIG. 4A, computing device 404 may be in location 410 that is different than location 406.

In some instances, applications 402A may be denied access to location information indicative of location 406. Further, applications 404A may be denied access to location information indicative of location 408. Yet further, applications 402A and 404A may be denied access to location information indicative locations 406 and 410.

Figure 4B:
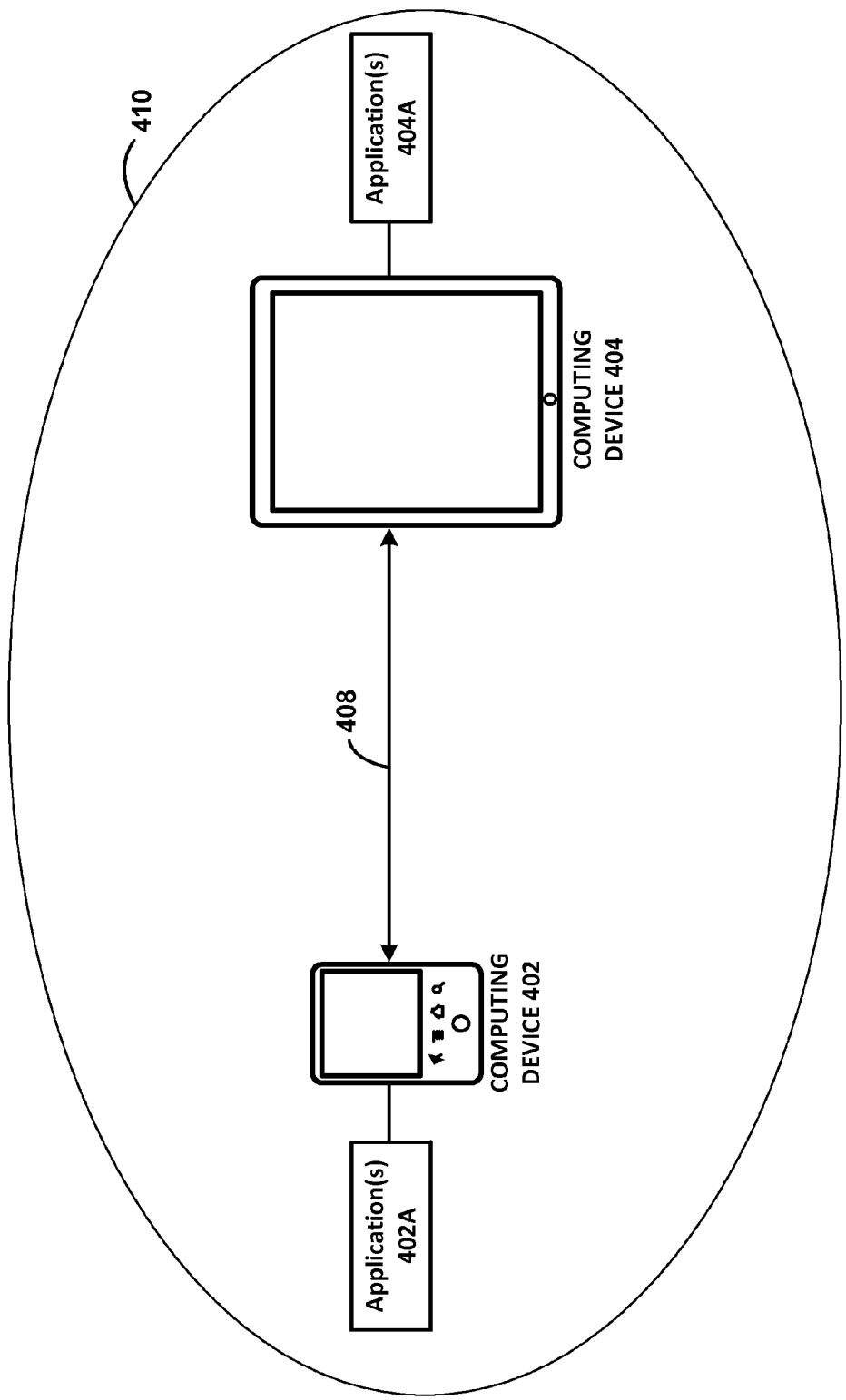
FIG. 4B depicts a computing device associated with a second location, according to an example embodiment.

FIG. 4B depicts a computing device associated with a second location, according to an example embodiment. Computing devices 402 and 404 may, for example, take any of the forms of computing devices described above in relation to FIG. 4A. Further, connection 408 may, for example, take any of the forms of connections described above in relation to FIG. 4A. Yet further, location 410 may, for example, take any of the forms of locations described above in relation to FIG. 4A. Yet further, one or more applications 402A and 404A may, for example, take any of the forms of applications described above in relation to FIG. 4A. Yet, as shown in FIG. 4B, computing devices 402 and 404 may both be in location 410 that is different than location 406 in FIG. 4A.

In some embodiments, applications 402A and 404A may be denied access to location information indicative of location 406 in FIG. 4A. Yet, in some instances, applications 402A and 404A may be allowed to access location information indicative of location 410. In particular, applications 402A and 404A may access this location information based at least on computing device 402 moving from location 406 to location 410 of computing device 404.

Referring back to the scenario of the user that may be shopping for a surprise gift for their partner, consider that location 406 is a jewelry shop that the user is shopping in. In particular, the user may want to hide their location when the user, while in possession of computing device 402, is at the jewelry shop at location 406. Yet, once the user is ready to leave the jewelry shop to go to location 410, the user may want to change the privacy settings such that the user no longer is hiding their location. As such, applications 402A and 404A may be denied access to location information indicative of location 406. Yet, applications 402A and 404 may be allowed access to location information indicative of location 410.

Figure 5:
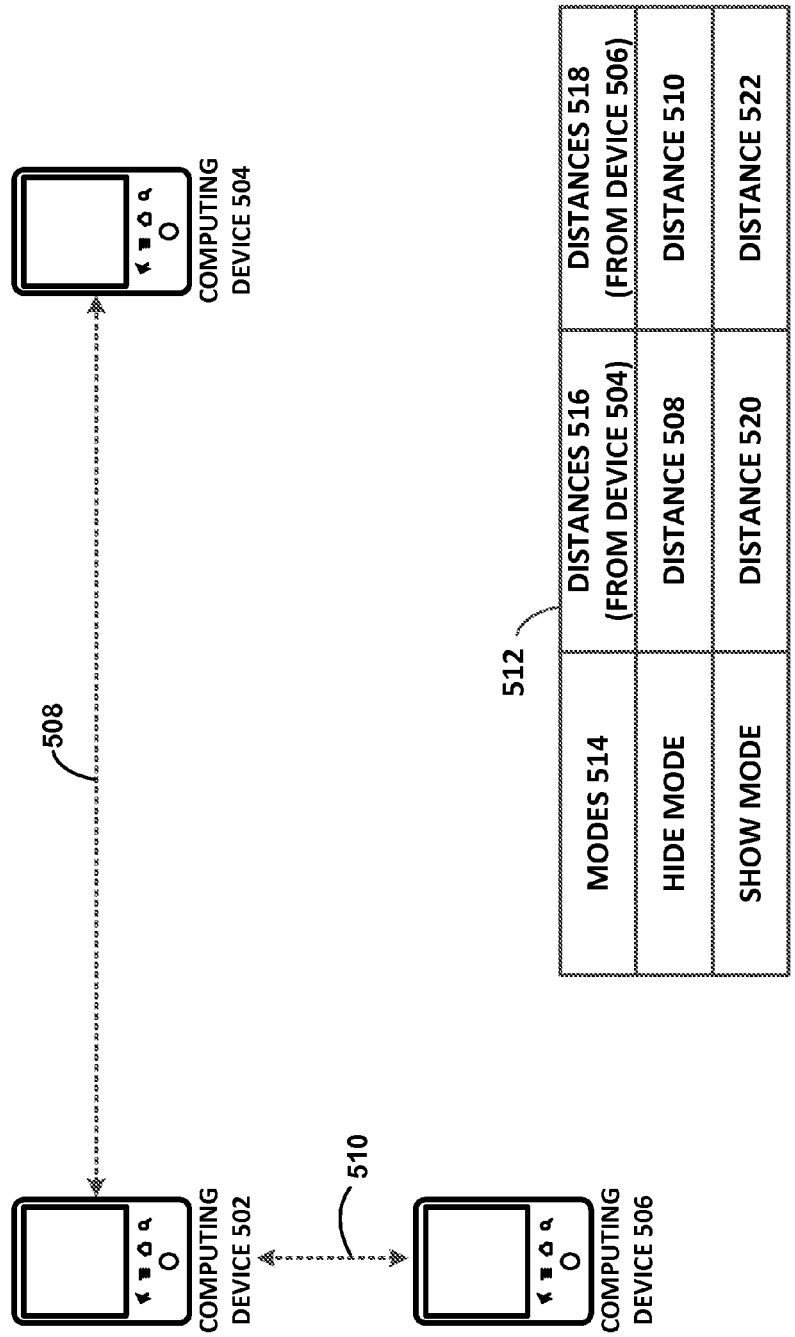
FIG. 5 depicts a distance between a computing device and other computing devices, according to an example embodiment.

FIG. 5 depicts a distance between a computing device and other computing devices, according to an example embodiment. Computing devices 502, 504, and 506 may, for example, take any of the forms of computing devices described above in relation to FIG. 1 through 4B. Computing device 502 may be a distance 510 away from computing device 506 such that computing device 502 may determine distance 510, possibly ranging from a few feet to multiple miles. Further, computing device 502 may be a distance 508 away from computing device 504 such that computing device 502 may determine distance 508, also possibly ranging from a few feet to multiple miles. In addition, data entry 512 may be stored on computing device 502.

As noted, determining location information indicative of a location of a computing device may include determining distances, possibly in relation to block 200 of FIG. 2. For example, computing device 502 may determine distance 508 between computing device 502 and computing device 504. Further, computing device 502 may determine distance 510 between computing device 502 and computing device 506.

Referring back to the scenario of the user that may be shopping for a surprise gift for their partner, consider that computing device 504 is the partner's smartphone and computing device 506 is the jeweler's smartphone. In particular, the user may want to hide their location when the user, while in possession of computing device 502, is in close proximity to the jeweler and a given distance away from the partner. In particular, the user may be a distance 508 away from the partner's smartphone (computing device 504) and a distance 510 near the jeweler's smartphone (computing device 506). Yet, once the user has finished discussing with the jeweler, the user may want to change the privacy settings such that the user no longer is hiding their location.

Thus, in some embodiments, a privacy setting of a computing device may be determined based on distances between the computing device and one or more other computing devices. For example, data entry 512 includes modes 514 such as "hide" mode and "show" mode, amongst other possible modes. Further, data entry 512 includes distances 516 between computing device 502 and computing device 504. Yet further, data entry 512 includes distances 518 between computing device 502 and computing device 506. As such, when computing device 502 is a distance 508 from computing device 504 and computing device 502 is a distance 510 from computing device 506, computing device 502 may enter hide mode. Yet further, when computing device 502 is a distance 520 from computing device 504 and computing device 502 is a distance 522 from computing device 506, computing device 502 may enter show mode. It should be noted that one or more other modes may be included in data entry 512 such as, for example, mix (work) mode in FIGS. 3B and 3C.

Figure 6:
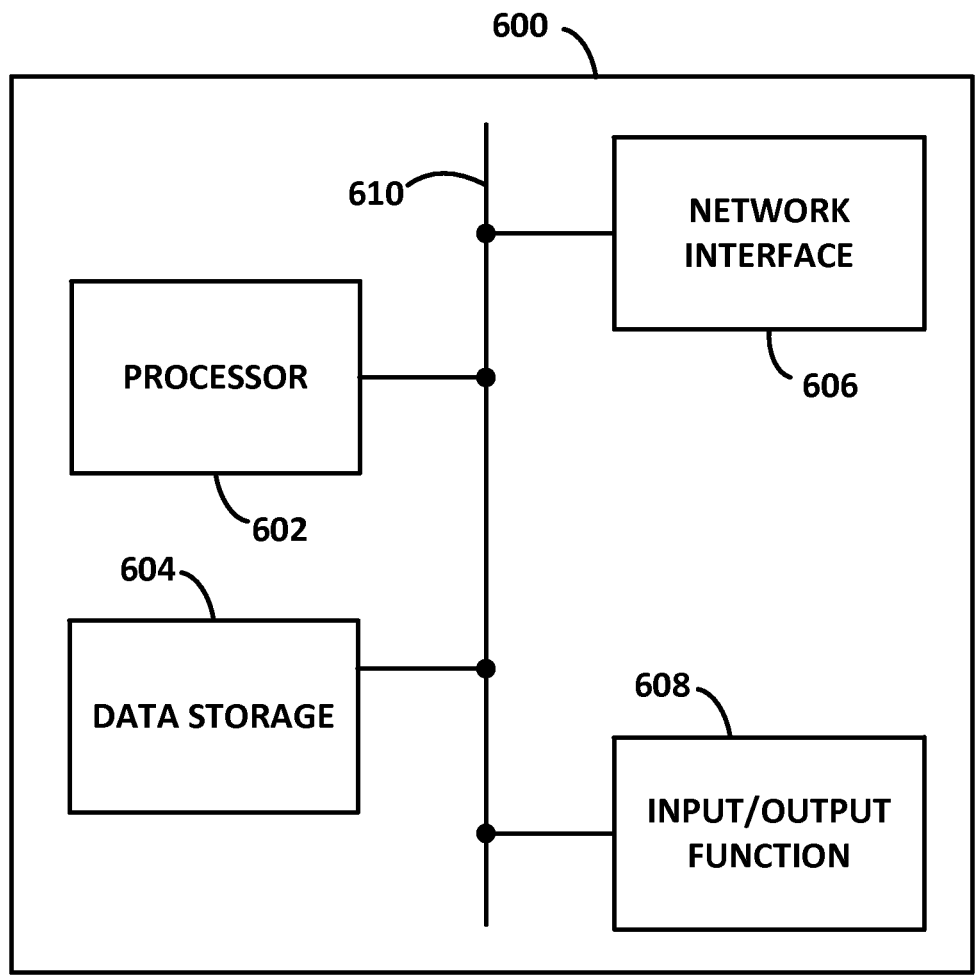
FIG. 6 depicts a computing device, according to an example embodiment.

FIG. 6 depicts a computing device, according to an example embodiment. Any of the computing devices described above in relation to FIGS. 1 through 5 may, for example, take the form of computing device 600. In particular, FIG. 6 illustrates some of the functional components that could be included in a computing device arranged to operate in accordance with the embodiments herein. For example, computing device 600 could be a smartphone, a wearable computer, a wearable computer with a head-mountable display, a personal computer (PC), a laptop, a server device, and/or some other type of computational platform. For purposes of simplicity, the server devices described above may be the same or similar to computing device 600. In particular, the server devices described above may include the components of computing device 600 as a processing unit. Further, it should be understood that the description of computing device 600 could apply to any component used for the purposes described herein.

As shown in FIG. 6, computing device 600 includes a processor 602, data storage 604, a network interface 606, and an input/output function 608, all of which may be coupled by a system bus 610 or a similar mechanism. Processor 602 can include one or more CPUs, such as one or more general purpose processors and/or one or more dedicated processors (e.g., application specific integrated circuits, digital signal processors, network processors, etc.).

Data storage 604, in turn, may comprise volatile and/or non-volatile data storage and can be integrated in whole or in part with processor 602. Data storage 604 may include data entries for transferring privacy settings such as data entry 360 and 512 in FIGS. 3C and 5, respectively. Data storage 604 can also hold program instructions, executable by processor 602, and data that may be manipulated by these instructions to carry out the various methods, processes, or functions described herein. Alternatively, these methods, processes, or functions can be defined by hardware, firmware, and/or any combination of hardware, firmware and software. By way of example, the data in data storage 604 may contain program instructions, perhaps stored on a non-transitory, computer-readable medium, executable by processor 602 to carry out any of the methods, processes, or functions disclosed in this specification or the accompanying drawings.

Network interface 606 may take the form of a wireline connection, such as an Ethernet connection. Network interface 606 may also take the form of a wireless connection, such as IEEE 802.11 (Wi-Fi), BLUETOOTH®, or a wide-area wireless connection. However, other forms of physical layer connections and other types of standard or proprietary communication protocols may be used over network interface 606. Furthermore, network interface 606 may comprise multiple physical interfaces.

Input/output function 608 may facilitate user interaction with example computing device 600. For example, input/output function may generate or display GUI 340 from FIG. 3B. Further, input/output function 608 may comprise multiple types of input devices, such as a keyboard, a mouse, a touch screen, and so on. Similarly, input/output function 608 may comprise multiple types of output devices, such as a screen, monitor, printer, or one or more light emitting diodes (LEDs). Additionally or alternatively, example computing device 600 may support remote access from another device, via network interface 606 or via another interface (not shown), such as a universal serial bus (USB) or high-definition multimedia interface (HDMI) port.

IV. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A computer-implemented method comprising:
   determining, at a computing device operating according to a user account, location information indicative of a location of the computing device;
   determining, by the computing device, one or more applications installed on the computing device and on one or more other computing devices that are configured to access the location information, wherein the one or more other computing devices operate according to the user account;
   determining, by the computing device, a privacy setting selected in the user account of the computing device that indicates whether the one or more applications installed on the computing device have access to the location information;
   transferring, by the computing device using the user account, the privacy setting selected in the user account of the computing device to the one or more other computing devices that operate according to the user account and are configured to access the location information and on which the one or more applications are installed; and
   based on the transferred privacy setting selected in the user account, determining, by the computing device, accesses of the one or more applications installed on the computing device and on the one or more other computing devices to the location information indicative of the location of the computing device.

2. The computer-implemented method of claim 1, wherein determining the location information indicative of the location of the computing device comprises determining one or more location signals associated with the computing device comprising a GPS signal, a Wi-Fi signal, a Bluetooth signal, a wireless USB signal, and a base station signal.

3. The computer-implemented method of claim 1, wherein the one or more other computing devices comprises a second device, wherein the method further comprises:
   determining second location information indicative of a second location of the second device, wherein the location differs from the second location;
   determining that the one or more applications are configured to access the second location information; and
   allowing the one or more applications to access the second location information indicative of the second location of the second device.

4. The computer-implemented method of claim 1, wherein the one or more other computing devices comprises a second computing device, wherein transferring the privacy setting of the computing device to the one or more other computing devices comprises:
   transferring the privacy setting to the second computing device based at least on the second computing device moving to the location of the computing device.

5. The computer-implemented method of claim 1, wherein the one or more other computing devices comprises a second computing device, wherein the method further comprises:
   allowing the one or more applications to access second location information indicative of a second location of the second computing device based at least on the computing device moving from the location to the second location of the second computing device, wherein the location differs from the second location.

6. The computer-implemented method of claim 1, wherein determining the location information indicative of the location of the computing device comprises determining a distance between the computing device and at least one of the one or more other computing devices, and wherein the method further comprises determining the privacy setting of the computing device based on the distance between the computing device and the at least one of the one or more other computing devices.

7. The computer-implemented method of claim 1, wherein determining the location information indicative of the location of the computing device comprises determining a change in distance between the computing device and at least one of the one or more other computing devices, and wherein the method further comprises determining the privacy setting of the computing device based on the change in distance between the computing device and the at least one of the one or more other computing devices.

8. A computing device comprising:
   one or more processors; and a computer-readable medium having stored thereon program instructions that when executed by the one or more processors cause the computing device to perform functions comprising:
  determining location information indicative of a location of the computing device operating according to a user account;
  determining one or more applications installed on the computing device and on one or more other computing devices that are configured to access the location information, wherein the one or more other computing devices operate according to the user account;
  determining a privacy setting selected in the user account of the computing device that indicates whether the one or more applications installed on the computing device have access to the location information;
  transferring, using the user account, the privacy setting selected in the user account of the computing device to the one or more other computing devices that operate according to the user account and are configured to access the location information and on which the one or more applications are installed; and
  based on the transferred privacy setting selected in the user account, determining accesses of the one or more applications installed on the computing device and on the one or more other computing devices to the location information indicative of the location of the computing device.

9. The computing device of claim 8, wherein determining the location information indicative of the location of the computing device comprises determining one or more location signals associated with the computing device comprising a GPS signal, a Wi-Fi signal, a Bluetooth signal, and a base station signal.

10. The computing device of claim 8, wherein the one or more other computing devices comprises a second device, wherein the method further comprises:
  determining second location information indicative of a second location of the second device, wherein the location differs from the second location;
  determining that the one or more applications are configured to access the second location information; and
  allowing the one or more applications to access the second location information indicative of the second location of the second device.

11. The computing device of claim 8, wherein the one or more other computing devices comprises a second computing device, wherein transferring the privacy setting of the computing device to the one or more other computing devices comprises:
  transferring the privacy setting to the second computing device based at least on the second computing device moving to the location of the computing device.

12. The computing device of claim 8, wherein the one or more other computing devices comprises a second computing device, wherein the method further comprises:
  allowing the one or more applications to access second location information indicative of a second location of the second computing device based at least on the computing device moving from the location to the second location of the second computing device, wherein the location differs from the second location.

13. The computing device of claim 8, wherein determining the location information indicative of the location of the computing device comprises determining a distance between the computing device and at least one of the one or more other computing devices, and wherein the method further comprises determining the privacy setting of the computing device based on the distance between the computing device and the at least one of the one or more other computing devices.

14. The computing device of claim 8, wherein determining the location information indicative of the location of the computing device comprises determining a change in distance between the computing device and at least one of the one or more other computing devices, and wherein the method further comprises determining the privacy setting of the computing device based on the change in distance between the computing device and the at least one of the one or more other computing devices.

15. A non-transitory computer-readable medium having stored thereon program instructions that when executed by a processor of a computing device cause performance of functions by the computing device in connection with a server device, the functions comprising:
  determining location information indicative of a location of a computing device operating according to a user account;
  determining one or more applications installed on the computing device and on one or more other computing devices that are configured to access the location information, wherein the one or more other computing devices operate according to the user account;
  determining a privacy setting selected in the user account of the computing device that indicates whether the one or more applications installed on the computing device have access to the location information;
  transferring, using the user account, the privacy setting selected in the user account of the computing device to the one or more other computing devices that operate according to the user account and are configured to access the location information and on which the one or more applications are installed; and
  based on the transferred privacy setting selected in the user account, denying the one or more applications installed on the computing device and on the one or more other computing devices from accessing the location information indicative of the location of the computing device.

16. The non-transitory computer-readable medium of claim 15, wherein determining the location information indicative of the location of the computing device comprises determining one or more location signals associated with the computing device comprising a GPS signal, a Wi-Fi signal, a Bluetooth signal, and a base station signal.

17. The non-transitory computer-readable medium of claim 15, wherein the one or more other computing devices comprises a second device, wherein the method further comprises:
  determining second location information indicative of a second location of the second device, wherein the location differs from the second location;
  determining that the one or more applications are configured to access the second location information; and
  allowing the one or more applications to access the second location information indicative of the second location of the second device.

18. The non-transitory computer-readable medium of claim 15, wherein the one or more other computing devices comprises a second computing device, wherein transferring the privacy setting of the computing device to the one or more other computing devices comprises:

transferring the privacy setting to the second computing device based at least on the second computing device moving to the location of the computing device.

19. The non-transitory computer-readable medium of claim 15, wherein the one or more other computing devices comprises a second computing device, wherein the method further comprises:

allowing the one or more applications to access second location information indicative of a second location of the second computing device based at least on the computing device moving from the location to the second location of the second computing device, wherein the location differs from the second location.

20. The non-transitory computer-readable medium of claim 15, wherein determining the location information indicative of the location of the computing device comprises determining a distance between the computing device and at least one of the one or more other computing devices, and wherein the method further comprises determining the privacy setting of the computing device based on the distance between the computing device and the at least one of the one or more other computing devices.

* * * * *